Feb. 14, 1939.  R. L. SCHLEIF  2,146,854
ELECTRICAL SOLDERING IRON
Filed July 27, 1936
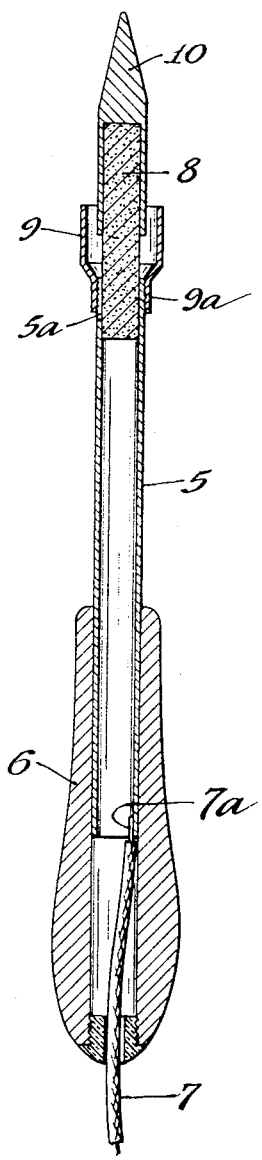
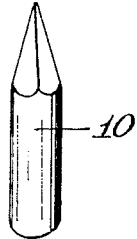
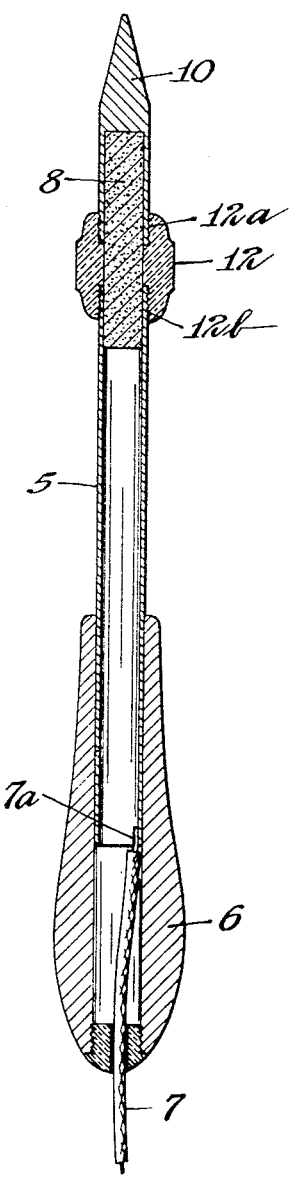
Inventor
Robert L. Schleif
By Williamson & Williamson
Attorneys Patented Feb. 14, 1939

2,146,854

UNITED STATES PATENT OFFICE

2,146,854
ELECTRICAL SOLDERING IRON

Robert L. Schleif, Minneapolis, Minn., assignor of one-third to William A. Conley and one-third to Joseph T. Conley, both of Minneapolis, Minn.

Application July 27, 1936, Serial No. 92,815

2 Claims. (Cl. 219—26)

This invention relates to soldering irons and particularly to a simplified, economical soldering iron heated by an electrical heating element.

It is an object of my invention to provide an extremely simple but highly efficient electrical soldering iron which utilizes for a heating element a rod or other solid element constructed from a material having a relatively high electrical resistance and which embodies that element preferably as a part of the shank and has a metallic tip applied to the outer end thereof in such a manner as to carry and apply the solder to a desired point.

A further object is to provide a simple and inexpensive soldering iron which may be successfully heated by electricity from a conventional storage battery and which embodies a solid heating element having a relatively high electrical resistance such as a carbon rod electrically connected with one terminal of the battery or other source and the circuit being completed to heat the iron by application of the tip to a grounded member.

More specifically it is an object to provide a soldering iron of the class described wherein the carbon or other electrical resistance rod constitutes a portion of the shank of the soldering iron and is provided with a heat retaining tip which is adapted to apply solder to a desired point and to retain sufficient heat for properly melting the same in the application of the solder.

These and other objects will be more apparent from the following description made in connection with the accompanying drawing wherein like reference characters refer to similar parts throughout the several views, and in which:—

Fig. 1 is a section taken longitudinally through one embodiment of my invention;

Fig. 2 is a similar section showing another form of my improved soldering iron, and Fig. 3 is a detail perspective view showing a metallic tip detached from the iron.

In the form of the invention illustrated in Fig. 1 a tubular metallic shank 5 is provided, constructed of conductive material having secured to one end thereof a handle 6 which preferably is made of material such as wood or fiber having no heat conductivity. Handle 6, as shown, is provided with an axial passage therethrough and is frictionally secured about the tubular shank 5 extending for some distance beyond the connected end of the shank and having one end of an electrically insulated conductor 7 extending therethrough and electrically connected at a point 7a with the shank 5.

The upper end of shank 5, as shown, is preferably slotted along the line 5a and has telescoped therein the inner end of a solid electrical resistance member 8 which may be a short carbon rod. The resistance rod 8 is secured to shank 5 as shown by means of the tapered clamping neck 9a of an annular guard member 9, the outer and greater portion of which is spaced some distance from the resistance rod 8. Clamping neck 9a is internally threaded to engage the external threads of the split or slotted upper end of the metal shank 5 and threadedly applied to the shank, clamps the same tightly about the lower portion of the resistance rod.

To the outer end of the resistance rod 8 is secured a metallic tip 10 having a cylindrical socket which surrounds rod 8 and is secured thereto frictionally or by other means. The tip 10 preferably has a solid pyramidal body of sufficient volume to retain heat for melting and applying solder.

The annular guard 9, as shown, is spaced from the periphery of the tip 10 and the resistance rod 8 and covers and protects the portion of the resistance rod 8 extending between the inner end of the tip and the adjacent end of the tubular shank 5.

In utilizing my improved soldering rod, an electrical circuit through the resistance rod 8 is completed by touching the tip to a grounded metallic member, whereupon the element 8 quickly heats the tip to a desired temperature after which the solder may be melted and applied in the usual manner, the tip containing then sufficient residual heat for such operation. If desired, of course, the metallic member to be soldered may be electrically connected with the other terminal of the storage battery or other source of electricity with which the conductor 7 is connected.

The metallic tip 10, of course, must be disconnected or insulated from the conductive shank 5 which is connected with the source of electricity.

In the form of the invention illustrated in Fig. 2 the shank 5, handle 6 and electrical connection are similar to those shown in the form first described. A solid resistance element such as a carbon rod 8 is telescoped within the outer end of the conductive shank and is secured thereto in suitable manner as by clamping. The tip 10 is identical in construction with the tip first described with the exception that the base end of the tip is preferably externally threaded to engage an internal thread 12a of a dielectric sleeve 12 which serves to rigidly connect the tubular shank with the tip. The inner end of the dielectric sleeve 12 preferably has a tapered internal thread 12b which is adapted to engage the external thread at the outer end of the shank 5 to compress the sleeve shank about the inner end of the resistance rod 8.

The operation of the form last described is identical with that of the form shown in Fig. 1. The structure of Fig. 2 is somewhat more rugged since a portion of the carbon rod or other resistance member connecting the shank with the tip is reinforced and the tip and shank connected by dielectric material.

From the foregoing description it will be seen that I have provided an extremely inexpensive electrical soldering iron embodying a minimum number of parts and capable of not only quickly melting solder for use, but also applying the solder through a metallic tip which retains heat as contrasted with carbon tipped soldering irons.

It will further be seen that to complete the circuit and heat the tip to operating temperature it is only necessary to touch the tip proper to any conductive device or member grounded with the source of electricity with which the conductive shank is electrically connected.

It will, of course, be understood that various changes may be made in the form, details, proportions and arrangement of parts without departing from the scope of my invention, which, generally stated, consists in a device capable of carrying out the objects above set forth, and in the novel parts and combinations of parts disclosed and defined in the appended claims.

What is claimed is:—

1. An electrical soldering iron comprising an electrically conductive shank, a rod constructed from material having a relatively high electrical resistance secured to said shank and electrically connected therewith, said rod having an undiminished outer end, a metallic tip having an elongated tubular portion directly surrounding and connected with the outer portion of said rod and spaced from said shank and a guard member surrounding the portion of said rod between said shank and tip and connected with one of said last mentioned members and spaced from said rod.

2. In combination with a grounded electrical circuit which includes a source of electrical energy, an electrical soldering iron comprising an electrically conductive shank, a rod constructed from material having a relatively high electrical resistance secured to said shank and electrically connected therewith, said rod having an undiminished outer end, a metallic tip having an elongated tubular portion directly surrounding and connected with the outer portion of said rod for some distance from the outer extremity thereof and electrically insulated from said shank, said rod between said shank and said tip having heat absorbing material surrounding that portion, an electrical conductor for connecting said shank with a live wire of said electrical circuit whereby said tip may be heated as well as the heat absorbing material surrounding said portion of said rod when said tip is grounded to said circuit, residual heat being stored in said tip and said heat absorbing material.

ROBERT L. SCHLEIF.